United States Patent [19]
Kim et al.

[11] Patent Number: 5,374,819
[45] Date of Patent: Dec. 20, 1994

[54] OPTICAL HEAD HAVING A BEAM CUTTING MIRROR WITH A TOTAL ABSORPTION SURFACE

[75] Inventors: Young-woong Kim; Chul-woo Lee, both of Seoul, Rep. of Korea

[73] Assignee: Samsung Electronics Co., Ltd., Kyungki-do, Rep. of Korea

[21] Appl. No.: 124,761

[22] Filed: Sep. 22, 1993

[30] Foreign Application Priority Data

Feb. 27, 1993 [KR] Rep. of Korea .................. 93-3029

[51] Int. Cl.⁵ .................................. G01J 1/20
[52] U.S. Cl. .................. 250/201.5; 369/44.23
[58] Field of Search .................. 250/201.5, 205, 203.2, 250/201.2, 226; 356/124, 124.5, 432, 435; 369/44.23, 44.22, 44.24, 44.42, 109, 110, 116, 119

[56] References Cited

U.S. PATENT DOCUMENTS

| | | | |
|---|---|---|---|
| 4,817,072 | 3/1989 | Toide et al. | 369/44.23 |
| 5,313,441 | 5/1994 | Imai et al. | 369/44.23 |

*Primary Examiner*—David C. Nelms
*Assistant Examiner*—Que T. Le
*Attorney, Agent, or Firm*—Lowe, Price, LeBlanc & Becker

[57] ABSTRACT

An optical head which optically reads and writes signals recorded on a recording medium comprises a beam cutting mirror provided to the rear of a beam splitter and having a total reflection surface, a total absorption surface, and a polarizing surface, and a photodetector detecting incident beams. Since the photodetector and the light source are provided on two parallel light source, the optical head of the present invention can use a laser beam detector and a photodetector for detecting focussing signals, tracking signals, and information signals as one package, so as to bring a rapid improvement in miniaturization, lightweight, and compaction.

19 Claims, 6 Drawing Sheets

OPTICAL HEAD HAVING A BEAM CUTTING MIRROR WITH A TOTAL ABSORPTION SURFACE

BACKGROUND OF THE INVENTION

The present invention relates to an optical head which optically reads and writes signals recorded on a recording medium, and in more detail, to an optical head in which a structure for detecting focusing error signals and tracking signals is improved.

Generally, the optical head detects a change of the focal point according to a change of a distance between an objective lens and a recorded medium so as to feed back the detected change to a location control system of the head. The structure for detecting such signals comprises a lens system having an objective lens which receives light reflected from the medium, a detector for receiving the light having passed through the lens system, and a light control system located between the lens system and the detector. Thus, the changed signal value is obtained in the detector according to the change of the distance between the objective lens of the lens system and the medium.

The lens system includes the objective lens and a detecting lens as basic components. The control system comprises a knife edge, as it is called, which is located along the central axis of the beam path, the above-mentioned detector, and a bisected photodetector on which the light passing through the knife edge is focussed. In such a structure, the light signal whose flux is divided into two parts along the central axis of the beam path at the knife edge is retransmitted through a beam splitter separately provided on the optical path between the lens system and the knife edge so as to compensate for astigmation. At the same time, the light signal is focussed around a laser diode chip being a light source so as to narrow the distance between the chip and the photo detector, thereby miniaturizing the optical system, which was possible only in the conventional hologram-type.

Figure 1:
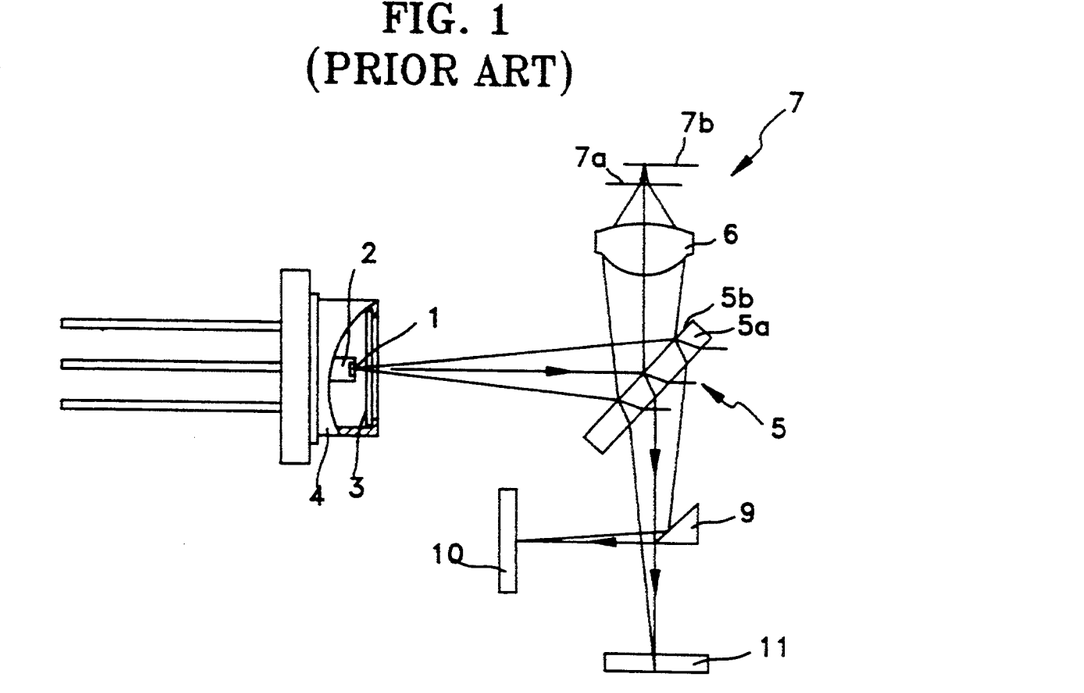
FIG. 1 shows a schematic structure of the conventional optical head.

FIG. 1 schematically illustrates the structure of a focussing and tracking signal detector of the conventional optical head. In the structure, the process for generating light and detecting the focal point and the tracking signal will be explained from the following description.

A reference numeral "7" represents the medium, with "7a" representing a protective substrate and "7b" representing a record surface thereof. A reference numeral "6" represents the objective lens, while "5" represents a beam splitter inclined at a predetermined angle with respect to the optical axis of the objective lens. Successively, a reference numeral "9" represents a knife edge, "11" represents the focussing signal detection photodetector, "1" represents the laser diode chip facing the beam splitter, "2" represents a mount for supporting the chip, "3" represents a cover glass being a protective glass, "4" represents a housing for housing and protecting the components, and "10" represents a tracking signal photodetector provided on the optical axis separated by knife edge 9. In such a structure, photodetector 11 for detecting focussing errors should be located at the focal point of the incident light, and photodetector 10 for detecting the tracking signals is located at a point of deviation from the focal point.

A laser light which is generated from laser diode chip 1 being the light source transmits through cover glass 3 being a protective glass so as to be incident to beam splitter 5 which has a coated surface 5b on a light transmittable substrate 5a. Among beams incident to beam splitter 5, some beams passing through coated surface 5b pass substrate 5a, and other beams reflected from coated surface 5b are focussed as fine spots by objective lens 6 so as to transmit through protective substrate 7a of media 7, thereby being concentrated on record surface 7b. The beams reflected from record surface 7b transmit through protective substrate 7 and objective lens 6. Then, a portion of the reflected beam is reflected by coated surface 5b of beam splitter 5, while the remainder is transmitted through substrate 5a. Portions of this transmitted beam are again reflected by knife edge 9 with the remainder thereof transmitting through the knife edge. Here, focal point signals are detected by photodetector 11 which detects the partially separated beam, and tracking signals are detected by photodetector 10 which detects the reflected beams.

The drawbacks exist in such a conventional optical head. Firstly, since the distance from beam splitter 5 to photodetectors 10 and 11 must be more than a predetermined distance, miniaturization is thus limited. Secondly, two photodetectors are required since they should be respectively positioned at the focal point surface and at same point adjacent thereto. Given that photodetector 10 for detecting the tracking signals is located at a place other than the focal surface, when the light incident to photodetector 10 moves in addition to the normally varying tracking signal, the thus-changed amount of light is detected so as to appear as a tracking error.

That is, in the conventional focussing and tracking signal detection type, since the focussing detection photodetector is located at the focal point of the detected light, detecting the tracking error is impossible. Accordingly, in the optical head for detecting the focussing error having the conventional knife edge type structure, a detector for detecting the tracking error is separately provided, miniaturization is further limited. Also, since the optical head is composed of many components, its manufacture is difficult the unit cost is high.

SUMMARY OF THE INVENTION

The present invention is for improving the defects of the conventional optical head. It is an object of the present invention to provide an optical head which accomplishes tracking error detection in one optical system with focus error detection.

To accomplish such an object, there is provided an optical head for detecting the tracking signals using the diffraction of a focal surface of a photodetector, comprising:

a light source which generates a laser beam;
a beam splitter which reflects a portion of the laser beam from the light source onto the surface of a recording medium;
an objective lens through which beams incident to and reflected from the recording medium pass;
a beam cutting mirror provided to the rear of the beam splitter, on which a total reflection surface and a total absorption surface are provided; and
a photodetector which detects beams reflected from the medium.

There is another type of the optical head according to the present invention to accomplish the above object comprising:

a light source which generates laser beams;

a beam splitter which reflects some of the laser beams from the light source onto the record surface of the media;

an objective lens through which beams incident to and reflected from the media pass;

a beam cutting mirror which is provided in the rear side of the beam splitter, and on which a polarizing film and a total absorption film on the front surface of the mirror and a total reflection surface in the rear side of the mirror are provided;

plural photodetectors, which detect beams reflected from the media.

In the optical head of the present invention as described above, the photodetectors and the optical source are provided on two or plural parallel optical axes, and more especially, are located at the focal point of each corresponding incident light. Additionally, the photodetectors are four separated photodetectors.

Photodetectors and the light source can form one package by the structure characteristics of the present invention.

The optical head according to the present invention is over the optical head of the conventional hologram type in miniaturization and has good performance, without defects which are deterioration of efficiency in the hologram type and increase of noise according to scattering lights. Additionally, the optical head has advantages of the knife edge type, that is, oscillation-resistant and cross talk characteristics of a lower level between the focal point and the tracking signals. Since the detecting surface of the tracking signal is positioned at the focal point of the detected light, the optical head according to the present invention has oscillation-resistant superior to the conventional optical head.

BRIEF DESCRIPTION OF THE DRAWINGS

The above object and other advantages of the present invention will become more apparent by describing in detail a preferred embodiment thereof with reference to the attached drawings in which:

FIGS. 8A, 8B and 8C show the state of beam spots focussed on a four separated photodetector of the optical head according to the present invention, wherein

DETAILED DESCRIPTION OF THE INVENTION

Figure 2:
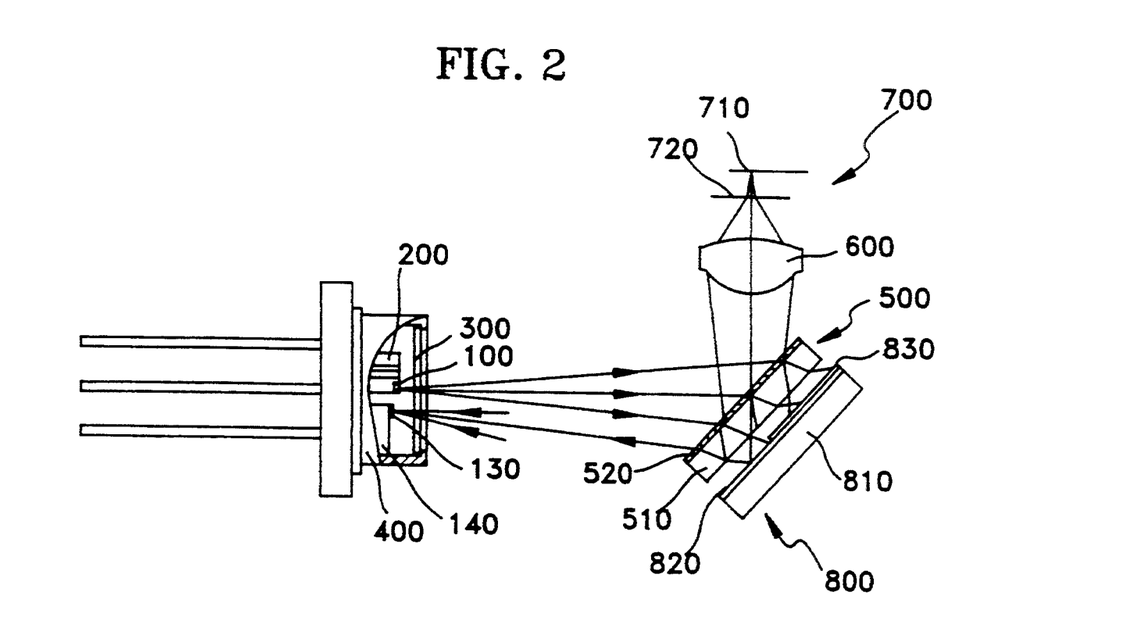
FIG. 2 shows a schematic structure of the first embodiment of the optical head according to the present invention.

Referring to FIG. 2, a reference numeral "700" represents a recording medium, "720" represents a protective substrate of the medium, and "710" represents a record surface. The reference numeral "600" represents an objective lens, and "500" is a beam splitter having a coated surface 520 on a substrate 510 and, inclined in a predetermined angle on an optical axis of the objective lens wherein the coated surface is not provided at partial upper of the lower parts of substrate 510 in the drawing, that is, the region which belongs to the beam path way from a total reflection film 820 of a cutting mirror described later. Further "800" is, as described above, the cutting mirror, wherein total reflection film 820 and a total absorption film 830 are formed on substrate 810, "100" represents a laser diode chip, and "300" represents a protective glass. Also, "130" represents a quadrature photodetector for detecting focussing and tracking signals, which is located at a focal point of an incident light, while "140" and "200" are mounts for supporting the chip and detector respectively, and "400" represents a housing for housing and protecting the entire components.

In the structure as described above, cutting mirror 800 corresponds to a conventional knife edge in the view of the function of the beam cutting mirror. By the structure and the operation characteristics, as described above, are a laser diode chip 100 and a quadrature photodetector 130 greatly closed, so as to be formed of one body.

If the process for detecting focussing and tracking signals in such an optical head according to the present invention is observed, a laser beam generated from laser diode chip 100 transmit through protective glass 300 so as to be reflected by beam splitter 500, thereby focussed on record surface 710 of media 700 through protective substrate 720 by objective lens 600. Then, the laser beams are again reflected so as to pass through protective substrate 720 and objective lens 600, thereby being incident to beam splitter 500. A portion of the incident beams is reflected so as to place the focal point on quadrature photodetector 130, and the remainder proceeds to cutting mirror 800. Also, a portion of the remainder of the laser beam which reaches total reflection film 820 of the cutting mirror is reflected so as to proceed to quadrature photodetector 130 through beam splitter 500 and focus thereon. The rest of the remainder which reaches total absorption film 830 is absorbed and eliminated, so that the laser beam is not perfectly reflected.

By such a type, the beam transmits twice through substrate 510 of beam splitter 500, so to modify the astigmation by substrate 510 having a predetermined thickness.

Figure 3:
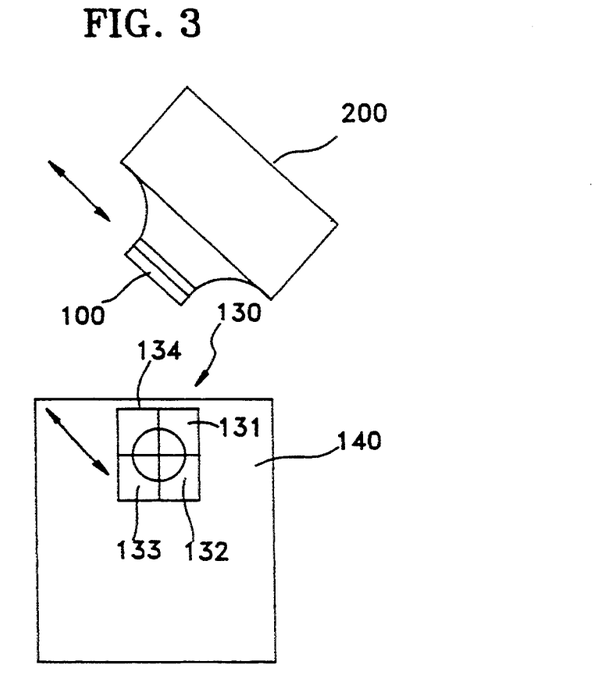
FIG. 3 is a front view diode chip and a photodetector of the optical head according to the present invention illustrated in FIG. 2.

FIG. 3 is a front view showing the relative position of the laser diode chip and the photodetector of the optical head according to the present invention, wherein arrows represent the polarizing direction of outgoing and detected light.

Figure 4:
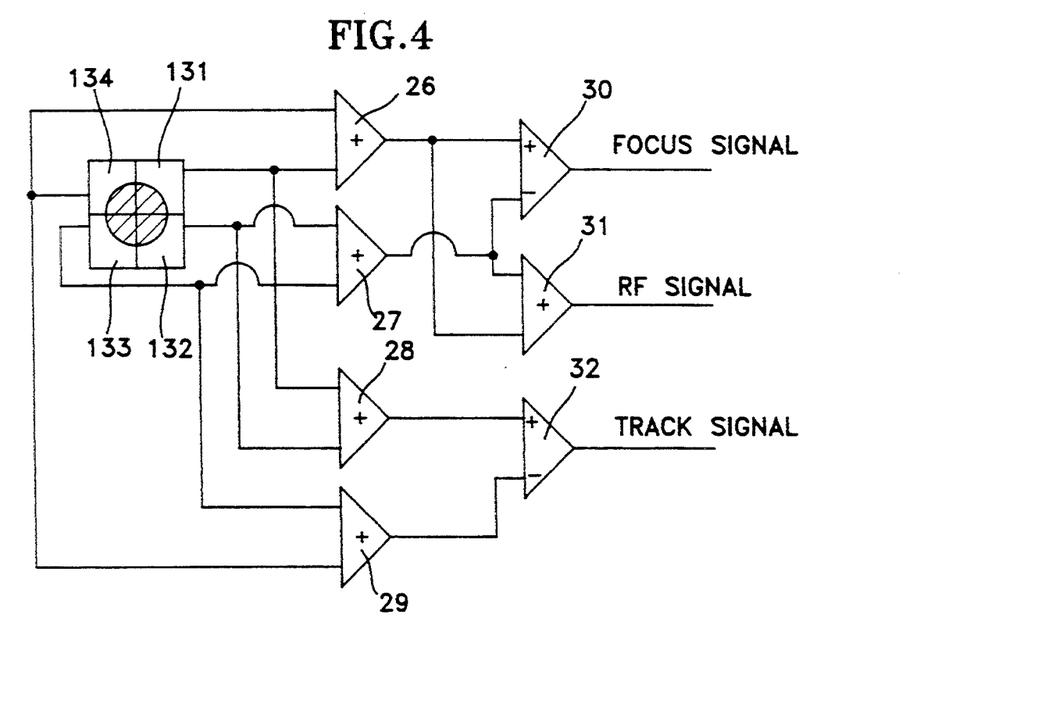
FIG. 4 is a diagram of a circuit for detecting signals applied to the optical head of the present invention illustrated in FIG. 2.
Figure 8A:
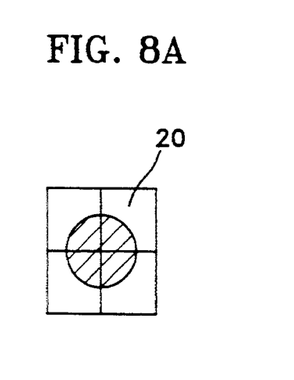
FIG. 8A shows the optimum focussing state.
Figure 8B:
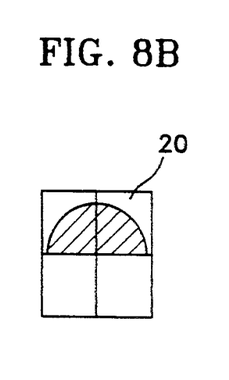
FIG. 8B and FIG. 8C show the states when the focal distance is far and short.
Figure 8C:
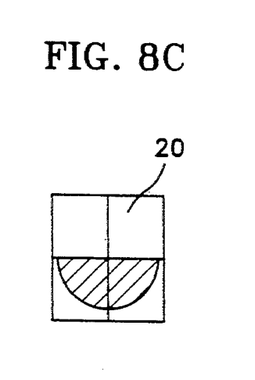

FIG. 8 shows states of beam spots focussed on the quadrature photodetector, wherein FIG. 8A shows an optimum focussed state, and FIGS. 8B and 8C are the states when the focal distances are far and near, respectively. Referring to a focussed signal detection circuit of FIG. 4 at such a focussed state, signals from the first and fourth quadrants 131 and 134 of quadrature photodetector 130 are summed by a first adder 26, and signals from the second and third photodetectors 132 and 133 are summed by a second adder 27. Then, when the outputs of first and second adders 26 and 27 are differentiated by a first differential motor 30, the outputs are obtained as focus control signals of objective lens 6. Tracking signals are obtained by means of third and fourth adders 28 and 29 and a second differential motor 32, and radio frequency signals are obtained by a summing amplifier 31.

Figure 5:
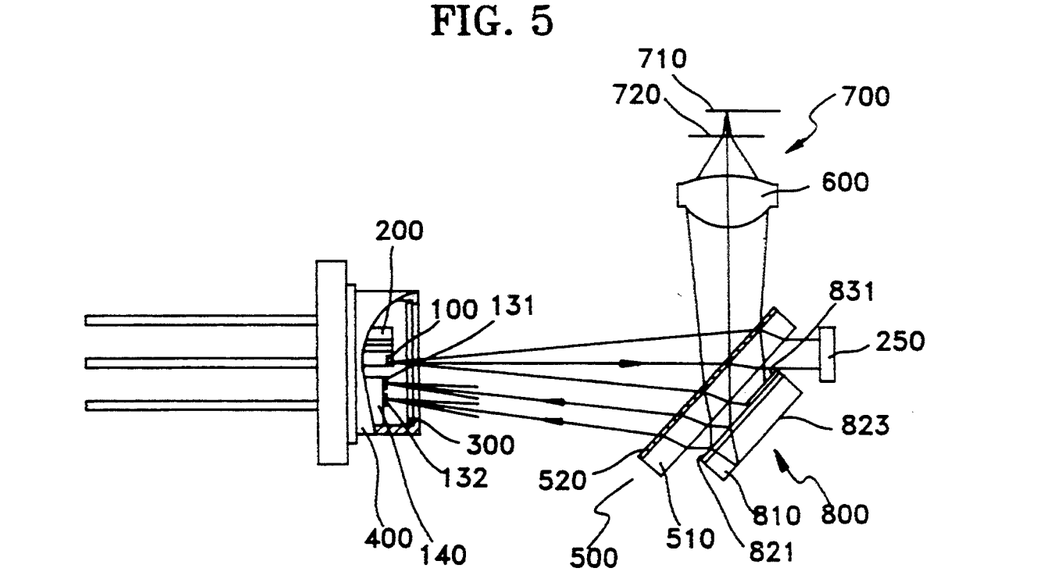
FIG. 5 shows a schematic structure of the first embodiment of the optical head according to the present invention.
Figure 6:
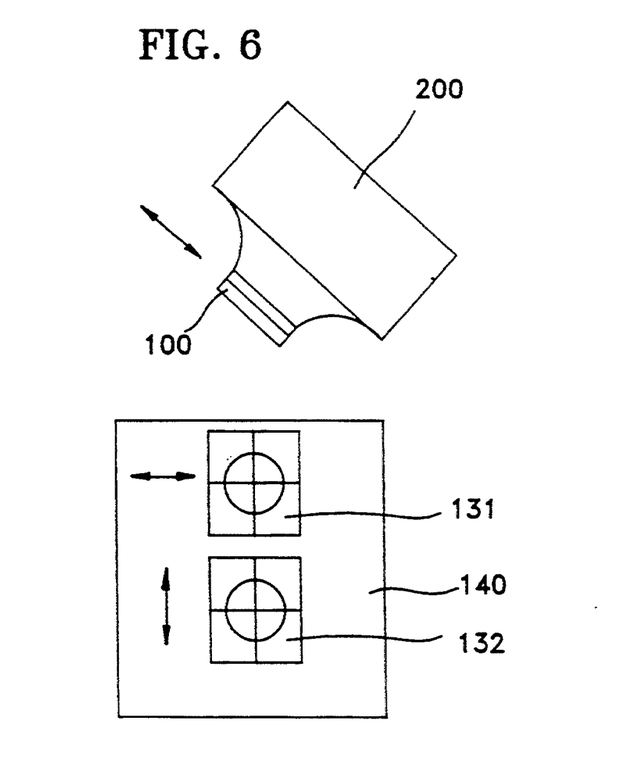
FIG. 6 is a front view of a package showing an arrangement of the laser diode chip and the photodetector of the optical head according to the present invention illustrated in FIG. 5.

FIG. 5 schematically shows the structure of another embodiment of the optical head according to the present invention. FIG. 6 is a front view showing the relative position of a laser diode chip 100 and a photodetector 200 applied to FIG. 5.

A general structure is similar with first embodiment illustrated in FIG. 2, so as to comprise objective lens 600, beam splitter 500 having coated surface 520 on substrate 510, cutting mirrors 800 on which total reflection film 823 is formed on the rear surface of substrate 810 and total absorption film 831 and polarization film 821 are separately formed on the front surface, laser diode chip 100, cover glass 300, two quadrature photodetectors 131 and 132 for detecting focussing and tracking signals, mounts 140 and 200 for supporting the chip and the detector, and a package having housing 400 for housing and protecting all of the above components.

In the structure as described above, the structure distinguishable from the first embodiment is that there are two photodetectors, total reflection surface 823 of cutting mirror 800 is positioned on the rear surface of substrate 810, and a beam-monitoring photodetector 25 is provided at the rear side of the beam splitter. Also the light progression and control states in such a structure are similar to those of the abovementioned embodiment, but the polarization of only one side is reflected so as to be focussed on the photodetector when light transmits through polarization film 821.

The portion of the beam which transmits through polarization film 821 passes through substrate 810, and are then reflected onto total reflection surface 823 of the rear side of substrate 810. This portion of the beam again transmits through polarization film 821, and here, polarizing film 821 transmits all of the reflected light. The above light beam passes through cover glass 300 of the laser diode package, and then, are detected from second photodetector 132. Here, the horizontally polarized beam filtered by polarization film 821 is detected by first photodetector 131, and the vertically polarized beam is detected by second photodetector 132.

The processes for detecting the local point, tracking, and record signals by the above structure of the present invention will be briefly described.

FIGS. 8A, 8B, and 8C show cross-sectional views of a light beam incident to photodetectors 131 and 132. In FIG. 8A the beam is cross-section is partly eliminated by beam cutting mirror 800 when the record surface of each media is located at the focal point, and FIG. 8B shows the record surface located far from the focal point, while FIG. 8C shows the focal point being close.

Figure 9A:
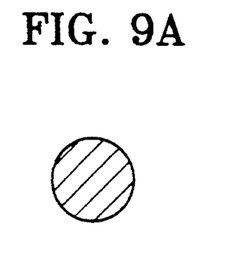
FIGS. 9A-C to 11A-C show cross-sectional views of light beams which are partly eliminated by a track located on a record surface of the media, wherein each drawing shows when light spots are not on the track, and when the track is at the right side and at the left side of the light beam.
Figure 9B:
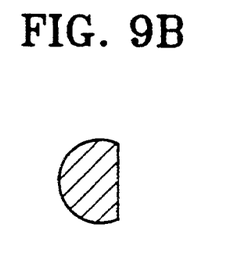
Figure 9C:
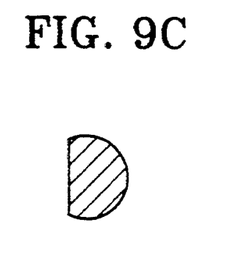
Figure 10A:
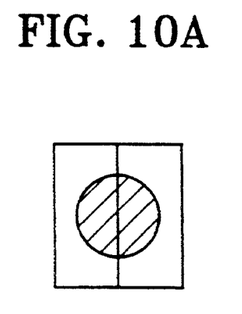
Figure 10B:
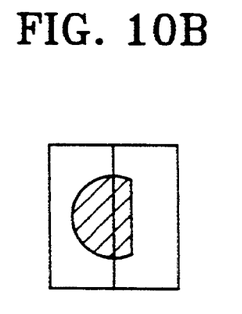
Figure 10C:
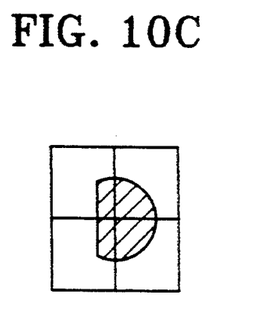
Figure 11A:
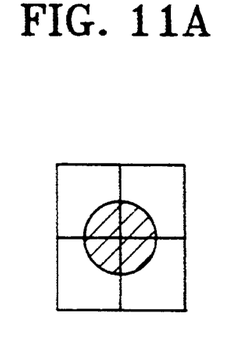
Figure 11B:
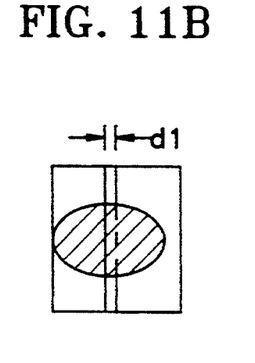
Figure 11C:
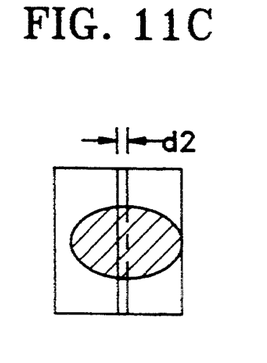

FIGS. 9 to 11 show cross-sections of light beams which are partly eliminated by tracks located on the record surface of the media, which show when each spot is not on the track, and when the track is at right side of the light beam and at left side of the light beam.

Figure 12:
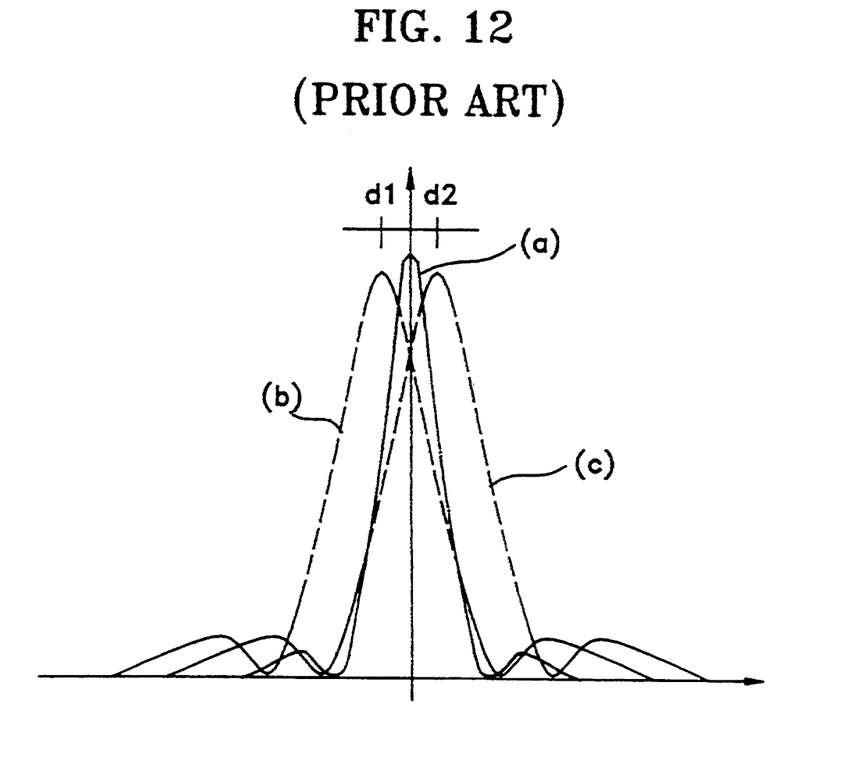
FIG. 12 is a distribution plot of light intensity around the focal point.
Figure 13:
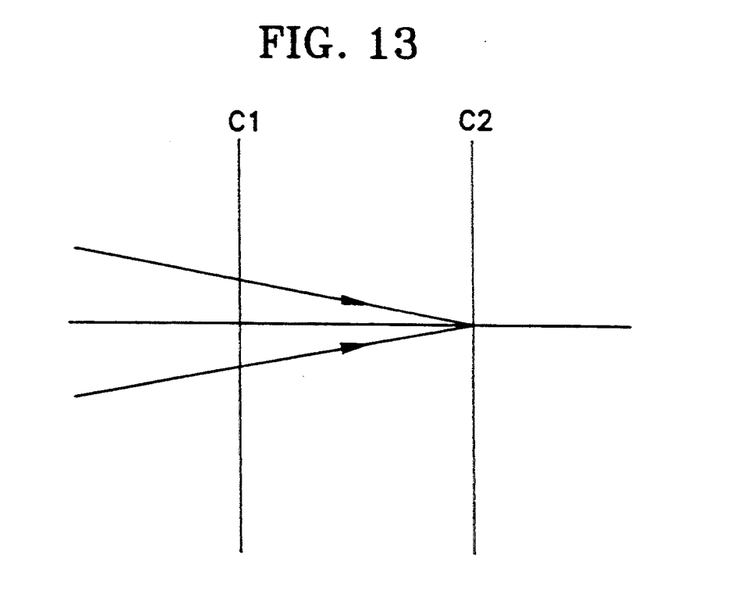
FIG. 13 shows a focussed state in the state which a two separated photodetector for use in examining tracking signals is located at $C_1$ apart from the focal point $C_2$ of the landed light.

FIG. 12 illustrates light beams on the bisected photodetector for detecting each tracking signal in the conventional type. That is, to detect the track in the conventional type, as illustrated in FIG. 13, the two-separated photodetector for use in detecting the tracking signals is installed at the location C, far from the focal point which is not the location $C_2$ of the focal point of the focussed light so as to differentiate the signals from each separated photodetector of the two-separated photodetector, thereby obtaining signals for controlling the track.

Meanwhile, in the tracking signal detecting type according to the present invention, as described above, to obtain tracking signals with the signals for controlling the track by separating the bisected photodetector for detecting the focal point into four parts, the photodetector is installed at the focal location $C_2$. If the photodetector is located at the focal point as described above, on the photodetector, the spots of the light beam having the tracking signals appear as illustrated in FIG. 9A, and the distribution of the spots appears, as illustrated by a curve (a) in FIG. 12, as a symmetric figure.

That is, when the track is symmetrically located spots focussed on a record surface 710 of the media by objective lens 600, the light beams of FIG. 9A are incident to first photodetector 131, so that the optical distribution on photodetector 20 located at the focal point of the received light becomes the symmetric figure, as shown by curve (a) in FIG. 12.

When the track is located at the left side of the focussed light, the cross-section of the light beam incident to the photodetector becomes as shown in FIG. 9B. When the track is located at the focal point of the received light, the optical distribution on the photodetector 20 similarly becomes the symmetric figure. Meanwhile, the width of such a distribution becomes large, and the central axis of the distribution is moved to the left side which is corresponded to d1 shown in FIG. 11B and FIG. 12(curve (b)), compared with when the track is symmetrically located. Accordingly, the tracking signals can be detected by differently detecting the left and the right photodetectors.

Additionally, when the track is located at the right side of the focussed light, the cross-section of the light beam landed on the photodetector and the cross-section of the light beam of the detected light are shown in FIG. 9C and FIG. 10C, and the distribution is shown in FIG. 12(curve (c)) where the length of d2 is moved, wherein the tracking signal of the opposite sign compared with when the track exists at the left side is detected.

Figure 7:
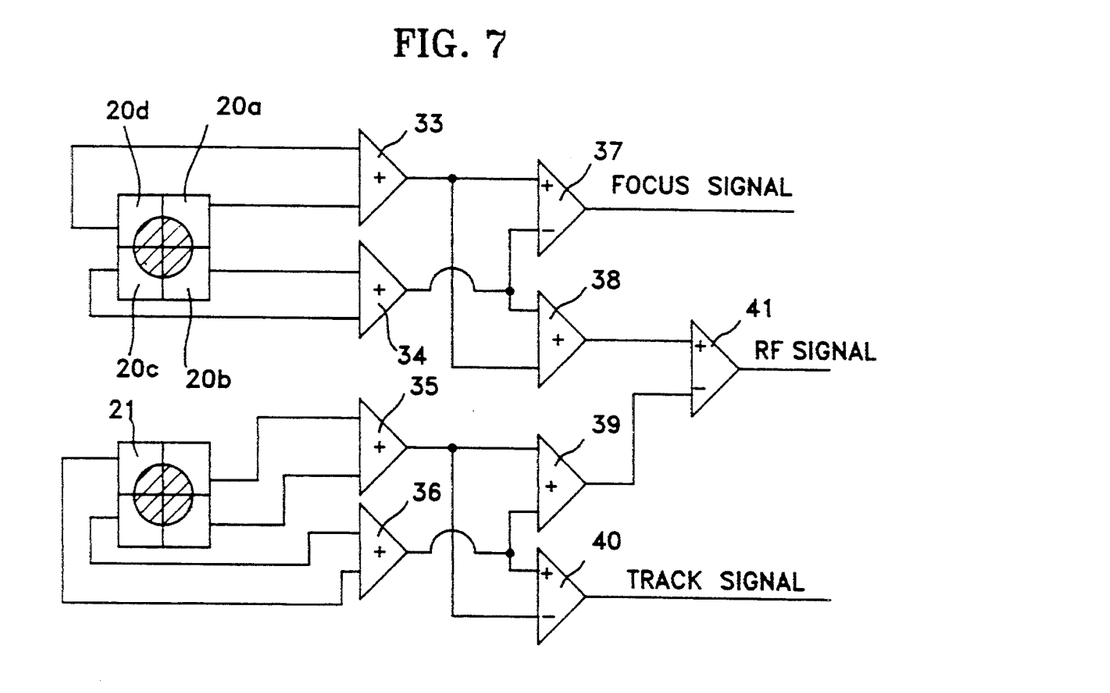
FIG. 7 is a diagram of a circuit for detecting signals applied to the optical head according to the present invention illustrated in FIG. 5.

Additionally, to detect the record signals, as a diagram of the signal detection circuit illustrated in FIG. 7, each signal from each separated photodetector of first photodetector 131 and second photodetector 132 is summed by the pair of adders 33 and 34 and that of adders 35 and 36. Each signal obtained therefrom is differentiated and summed by each of differential amplifiers 37 and 40, and adders 38 and 39 so as to obtain the focus signal and the tracking signal. The signals summed in summing amplifiers 38 and 39 are differentiated by differential amplifier 41 so as to obtain the radio frequency signal.

As described above, in the optical head of the present invention, the laser beam detector and the photodetector for detecting the focal signal, the track signal, and the information signal are incorporated into one package, so as to bring rapid progress to miniaturization, reduced weight, and component density. Additionally, compared with the conventional hologram type capable of being miniaturized, there is no loss of light, so as to expect an improvement of efficiency according to the increase of the amount of received light. More specifically, fabrication and control are excellent with a decrease of the number of components so as to reduce the cost of materials and manufacture. Particularly, a lightweight device and stable detection of the focal point and the tracing signals is possible when the optical head is moved at high speed so as to be applicable in high speed magneto-optical disc drives.

Such an optical head according to the present invention detects tracking signals using the diffraction of the focal surface of the photodetector. The optical head according to the present invention is advantageous over the optical head according to the conventional hologram type in terms of miniaturization, and has good efficiency which obviates the aforementioned defects, that is, deterioration of the efficiency in the hologram type and increase of noise according to the scattering light. Additionally, the optical head has the advantages that the knife edge type has, that is, oscillation-resistance, and cross-talk characteristics of the lower level between the focal point and the tracking signals. Since the detection surface of the tracking signals is positioned at the focal point of the detected light, the optical head is more oscillation-resistant.

What is claimed is:

1. An optical head comprising:
   a light source which generates a laser beam;
   a beam splitter which reflects a portion of the laser beam from said light source onto a record surface of a medium;
   an objective lens through which the beam portion incident to and reflected from said medium passes;
   a beam cutting mirror provided to the rear of said beam splitter, and on which a total absorption surface is provided; and
   a photodetector which detects laser beams reflected from said medium.

2. The optical head as claimed in claim 1, wherein said photodetector and said light source are provided on two parallel optical axes.

3. The optical head as claimed in claim 1, wherein said photodetector is located at the focal point of the incident light.

4. The optical head as claimed in claim 1, wherein said photodetector is a quadrature photodetector.

5. The optical head as claimed in claim 2, wherein said photodetector is a quadrature photodetector.

6. The optical head as claimed in claim 3, wherein said photodetector is a quadrature photodetector.

7. The optical head as claimed in claim 4, wherein said photodetector and said light source form one package.

8. The optical head as claimed in claim 1, wherein said photodetector and said light source form one package.

9. The optical head as claimed in claim 2, wherein said photodetector and said light source form one package.

10. The optical head as claimed in claim 3, wherein said photodetector and said light source form one package.

11. An optical head comprising:
    a light source which generates a laser beam;
    a beam splitter which reflects a potion of the laser beam from said light source onto the record surface of a medium;
    an objective lens through which the beam portions incident to and reflected from said medium passes;
    a beam cutting mirror provided to the rear of said beam splitter, wherein a polarizing film and a total absorption film are formed on the front surface and a total reflection surface is provided on the rear surface; and
    plural photodetectors which detect laser beams reflected from said medium.

12. The optical head as claimed in claim 11, wherein said photodetectors and said light source are provided on parallel and plural optical axes.

13. The optical head as claimed in claim 11, wherein said photodetectors are located at the respective focal points of the corresponding incident light.

14. The optical head as claimed in claim 11, wherein said photodetectors are quadrature photodetectors.

15. The optical head as claimed in claim 12, wherein said photodetectors are quadrature photodetectors.

16. The optical head as claimed in claim 13, wherein said photodetectors are quadrature photodetectors.

17. The optical head as claimed in claim 11, wherein said photodetector and said light source form one package.

18. The optical head as claimed in claim 12, wherein said photodetector and said light source form one package.

19. The optical head as claimed in claim 13, wherein said photodetector and said light source form one package.

* * * * *